July 21, 1936.   A. G. WITTSTOCK   2,048,585
COMBINED HYDRAULIC CLUTCH AND TRANSMISSION MECHANISM
Filed July 10, 1935   2 Sheets-Sheet 1
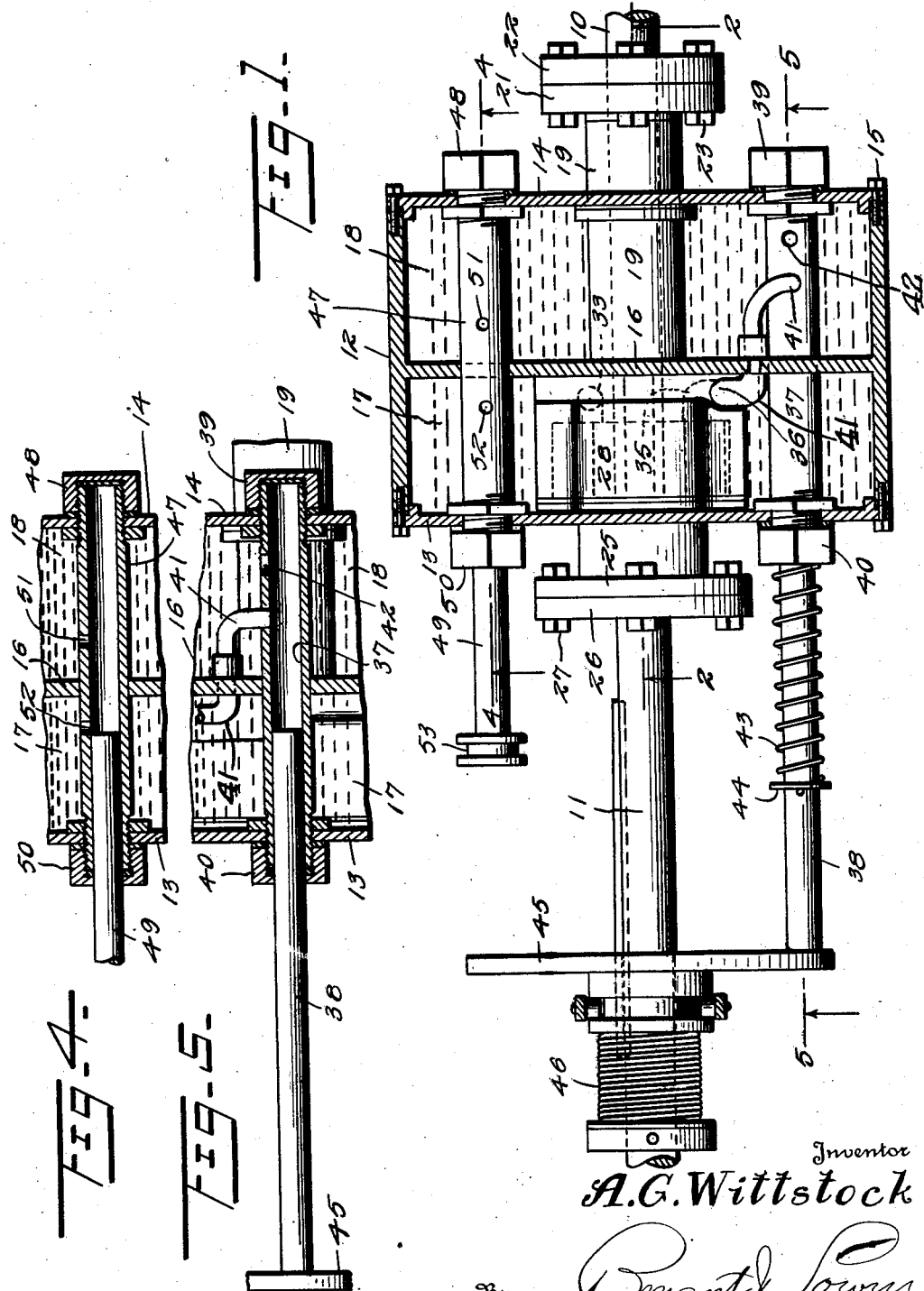

July 21, 1936.   A. G. WITTSTOCK   2,048,585
COMBINED HYDRAULIC CLUTCH AND TRANSMISSION MECHANISM
Filed July 10, 1935   2 Sheets-Sheet 2
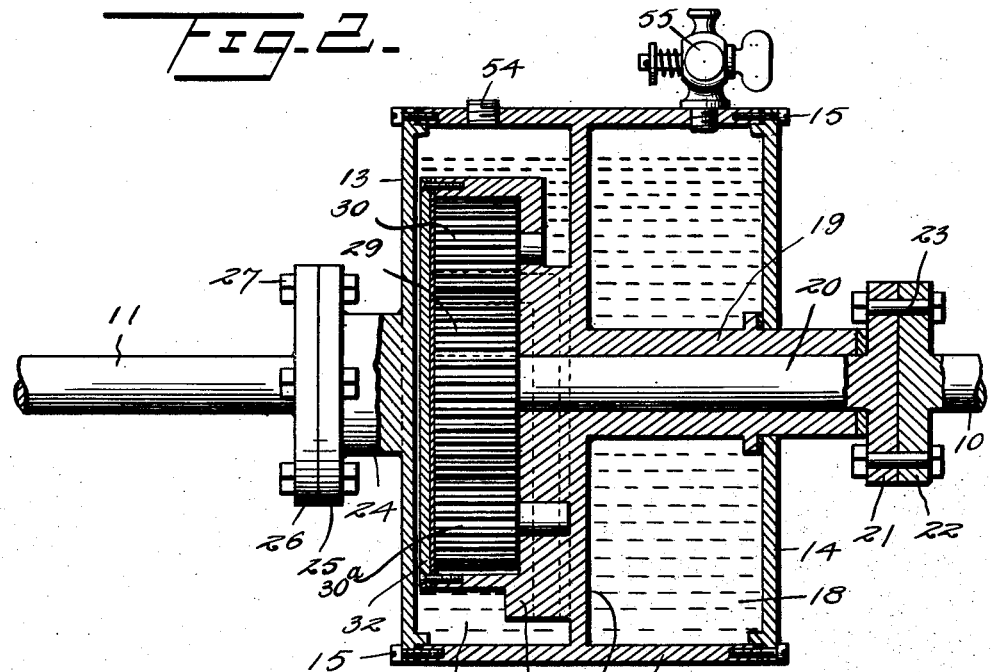
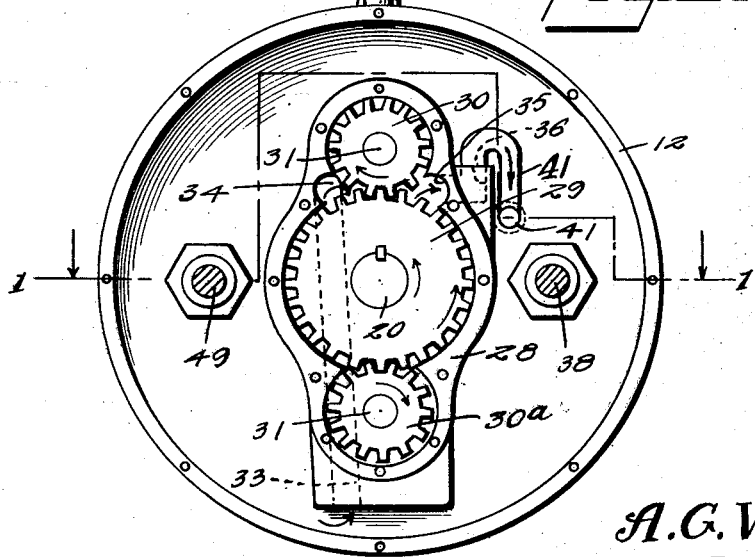
Inventor
A. G. Wittstock
By Bryant & Lowry
Attorneys Patented July 21, 1936

2,048,585

UNITED STATES PATENT OFFICE 2,048,585

COMBINED HYDRAULIC CLUTCH AND TRANSMISSION MECHANISM

Alfred G. Wittstock, Newark, N. J.

Application July 10, 1935, Serial No. 30,761

10 Claims. (Cl. 192—61)

This invention relates to certain new and useful improvements in combined hydraulic clutch and transmission mechanism.

In power driven mechanism, such as is employed in the propulsion of motor vehicles, airplanes and in the operation of other mechanism wherein a device is driven at variable speeds, it is customary to employ a manually operable or mechanical clutch for connecting the power plant to the mechanism to be driven and to utilize a gear train with manually operable means for sh'fting certain gears of the train to cause a device to be driven at variable speeds and the primary object of this invention is to eliminate a mechanical clutch and gear train and substitute a unitary structure in the form of a manually controlled combined hydraulic clutch and transmission.

A further object of the invention is to provide apparatus of the foregoing character that is extremely simple in construction and operation and is operated to function as the clutch between a power plant and driven element and a variable speed control or drive for the driven element.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a horizontal sectional view taken on line 1—1 of Figure 3, showing the combined hydraulic clutch and transmission interposed between the drive shaft and the power plant and the driven element;

Figure 2 is a longitudinal section view taken on line 2—2 of Figure 1, showing the meshing gears of the pump device for building up pressure on the fluid;

Figure 3 is an end elevational view of the housing with the end wall removed to illustrate the pump gear mechanism of the combined hydraulic clutch and transmission;

Figure 4 is a sectional view taken on line 4—4 of Figure 1, showing the retarder slide valve for relieving pressure in the apparatus; and Figure 5 is a longitudinal sectional view taken on line 5—5 of Figure 1, showing the slide control valve to effect the variable speed drive between the power plant and driven element.

While it is to be understood that the invention disclosed herein is adaptable for use in various arts where a clutch and transmission mechanism are interposed between drive and driven elements, the invention for purposes of clarity will be described as associated with a power plant of a motor vehicle and as shown in Figures 1 and 2, the reference character 10 designates the drive or crank shaft of an automobile engine and the reference character 11 designates the driven shaft of the automobile that is engaged at its rear end in the usual manner with differential mechanism. The combined hydraulic clutch and transmission mechanism is interposed between the engine shaft 10 and driven shaft 11 and includes a cylindrical casing 12 having removable end walls 13 and 14 secured to the cylindrical casing in an oil-tight manner by means of anchor bolts 15. A central partition 16 in the casing 12 divides the latter into separate compartments 17 and 18 that are completely filled with oil or other hydraulic fluid.

A tubular shaft bearing 19 projects laterally of the central partition 16 through the compartment 18 and removable end wall 14 for the rotatable support of a shaft 20 having a flanged outer end 21 abutting the flanged head 22 on the adjacent end of the drive shaft 10 and to be anchored to said head by means of anchor bolts 23.

A block projection 24 is carried centrally of the outer face of the removable end wall 13 of the casing 12 and carries a flanged head 25 for flatly abutting the flanged head 26 on the driven shaft 11 and to be secured thereto by anchor bolts 27.

A pump gear mechanism is arranged in the compartment 17 for placing the fluid under pressure and comprises a housing 28 carried by the side of the central partition 16 facing the compartment 17, the housing receiving a gear 29 keyed to the adjacent end of the shaft 20 and meshing with lateral gears 30 and 30a mounted on stub shafts 31 journalled in the housing 28. A sealing gasket and cover 32 are secured to the open side of the pump gear housing 28 as shown more clearly in Figure 2 and the interior of the pump gear housing is designed relative to the gears 29 and 30 to effect a flow of oil therethrough during rotation of said gears for the purpose of building up pressure on the oil. The arcuate wall in the housing 28 surrounding the gear 30a is slightly spaced from the gear whereby oil that is carried downwardly by the gear 29 will seep around the gear 30a and be retarded in its upward travel in opposition to the path of movement of the gear 30a to be picked up by the gear 29 for movement to the pocket 35. The oil travels in a circuitous path as indicated by the direction arrows in Figure 3, the pump gear housing 28 having an inlet passage 33 leading to a pocket 34 with the gears rotatable in directions indicated by the arrows for carrying the oil to the pocket 35 and outlet 36 at the end of the pump gear housing opposite the inlet 33 to a pipe or conduit 41 to be later described. As stated, a part of the oil flows around the gear 30a through the space between the gears 29 and 30a and is conveyed by the gear 29 to the outlet 36 and conduit 41.

A slide valve is associated with the casing 12 and gear pump mechanism for effecting the driving of the shaft 11 at variable speeds and includes a tubular valve casing 37 extending longitudinally of the casing 12, laterally of the bearing 19 with a slide valve rod 38 reciprocable therein. The valve casing 37 extends through opposite ends of the casing 12 with one end capped as at 39 outwardly of the end wall 14, while the valve rod 38 extends outwardly of the other end of the casing 37 and is surrounded by a packing nut 40. A conduit 41 forms communication between the outlet 36 of the gear housing 28 and the end of the valve casing 37 adjacent the end wall 14 and said valve casing 37 has a lateral valve opening 42 communicating with the compartment 18.

The valve rod 38 outwardly of the casing 12 is surrounded by a coil spring 43 interposed between the packing nut 40 and stop collar 44 carried by the valve rod in spaced relation to its outer end for normally forcing the valve rod to a position for completely opening the valve 42. A disk 45 is splined on the driven shaft 11 as shown in Figure 1, the disk 45 being tensioned as at 46 whereby the same is normally held in its retracted position and the spring 43 on the valve rod 38 holds the valve rod in contact with the disk 45.

A valve constructed to retard the flow of oil is associated with the casing 12 and as shown in Figures 1 and 4 comprises a tubular valve casing 47 extending longitudinally of the casing 12 and projecting from the ends thereof, the end adjacent the end wall 14 of the casing being capped as at 48. A valve rod 49 is reciprocable in the tubular valve casing 47 and the other end of the valve casing 47 receives a packing nut 50 surrounding the valve rod 49. Valve openings 51 and 52 formed in a side wall of the tubular valve casing 47 respectively communicate with the compartments 18 and 17 in the casing 12 and said valve rod 49 is adapted to extend over the openings 51 and 52, said rod being so constructed as to provide a predetermined seepage through the openings. This arrangement builds up pressure on the oil and retards rotation of the gears. The outer projecting end of the valve rod 49 is fashioned as at 53 to facilitate attachment thereto of the manually operated device under control of the operator.

When the control valve 38 and retarder valve 49 are retracted to the positions shown in Figures 4 and 5 and the engine shaft 10 is being driven, the gear 29 rotates and in turn rotates the gears 30 and 30a to cause a circuitous flow of the oil in the casing 12 through the pump gear housing 28, conduit 41, valve casing 37 and valve opening 42 into compartment 18 and from the latter through the valve opening 51 into the tubular valve casing 47 to exit therefrom through the valve opening 52 into the compartment 17.

With the retarder valve 49 shifted to extend over the valve openings 51 and 52, the oil is pumped by the gears 29, 30 and 30a through the pump gear housing 28 and through the conduit 41 into one end of the control valve casing 37, this action of the gears tending to build up pressure on the oil and retard rotation of the gears 29, 30 and 30a. Pressure on the oil is increased when the control valve 38 is moved into the valve casing 37 and a predetermined movement of the control valve 38 builds up sufficient pressure on the oil in the casing 12 to prevent rotation of the gears 29 and 30 and 30a with the pressure on the oil forming a clutch connection between the casing 12 and drive shaft 10 to effect rotation of the casing 12 and driven shaft 11 of the motor vehicle that is secured to the casing 12 as shown in Figure 2. Further predetermined movements of the control valve 38 into the tubular valve casing 37 effect the driving of the shaft 11 at variable speeds comparable with the usual gear transmission mechanism of an automobile, the speed of rotation of the driven shaft 11, of course, being further controlled by the usual fuel feed or accelerator mechanism of the motor. When the valve rod 38 closes the valve opening 42 in valve casing 37, the flow of oil by the pump gears is checked and the bleed valve 49 may be opened so that oil will flow freely between the compartments 17 and 18 when the valve 38 is retracted. The control valve 38 is operated by the disk 45 which in turn may be controlled in its operation by a suitable element on the instrument board or steering wheel of the motor vehicle. It will be observed that the usual clutch and gear transmission mechanism of a motor vehicle is herein combined in a single hydraulically operated device that accomplishes the objects of the variable gear ratios of the transmission mechanism by the degree of pressure exerted on the fluid or oil in the casing 12. The casing 12 is charged with fluid or oil through an opening closed by the screw plug 54 and said casing is drained by means of the jet cock 55. It is to be understood that reversing mechanism may be associated with the combined hydraulic clutch and transmission for operation in a similar manner.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

1. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments.

2. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment, spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments, including a cylindrical valve casing extending through the compartment and having a valve opening for each compartment and a slide valve rod therein.

3. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments, the first named slide valve rod extending exteriorly of the housing and tensioned in its direction of opening movement and manually operable means engaged with the projecting end of the rod for moving the same into the valve casing.

4. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment, spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments, including a cylindrical valve casing extending through the compartment and having a valve opening for each compartment and a slide valve rod therein, the first named slide valve rod extending exteriorly of the housing and tensioned in its direction of opening movement and manually operable means engaged with the projecting end of the rod for moving the same into the valve casing.

5. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments, the first named slide valve rod extending exteriorly of the housing and tensioned in its direction of opening movement and manually operable means engaged with the projecting end of the rod for moving the same into the valve casing, including a disk splined on the driven shaft, and a spring for normally holding the disk in retracted position.

6. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment, spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments, including a cylindrical valve casing extending through the compartment and having a valve opening for each compartment and a slide valve rod therein, the first named slide valve rod extending exteriorly of the housing and tensioned in its direction of opening movement and manually operable means engaged with the projecting end of the rod for moving the same into the valve casing, including a disk splined on the driven shaft and a spring for normally holding the disk in retracted position.

7. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments, the pump gear mechanism including a center gear fixed to the drive shaft, a pair of side gears meshing with the center gear, an inclosure for the gears and an inlet and outlet for the housing with one of the side gears retarding the flow of oil to the outlet to increase pressure on the oil.

8. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment, spaced from the pump mechanism, a conduit forming communication between the pump mechanism and valve casing in the other compartment, a slide valve rod in the valve casing adapted to be operated for controlling the flow of oil through the pump gear mechanism whereby gears may be locked against rotation to cause the housing to rotate with the drive shaft and rotate the driven shaft and other means forming communication between the two compartments, including a cylindrical valve casing extending through the compartment and having a valve opening for each compartment and a slide valve rod therein, the pump gear mechanism including a center gear fixed to the drive shaft, a pair of side gears meshing with the center gear an inclosure for the gears and an inlet and outlet for the housing with one of the side gears retarding the flow of oil to the outlet to increase pressure on the oil.

9. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments, the first named slide valve rod extending exteriorly of the housing and tensioned in its direction of opening movement and manually operable means engaged with the projecting end of the rod for moving the same into the valve casing, the pump gear mechanism including a center gear fixed to the drive shaft, a pair of side gears meshing with the center gear, an inclosure for the gears and an inlet and outlet for the housing with one of the side gears retarding the flow of oil to the outlet to increase pressure on the oil.

10. In a combined hydraulic clutch and transmission mechanism, a housing containing oil, a drive shaft extending into the housing and rotatable therein, a driven shaft alined with the drive shaft and fixed to a wall of the housing exteriorly thereof, a partition in the housing forming separate compartments, a pump gear mechanism in one compartment operatively engaged with the drive shaft, a cylindrical valve casing extending through the two compartments and having a valve opening in the compartment, spaced from the pump mechanism, a conduit forming communication between the pump mechanism and valve casing in the other compartment, a slide valve rod in the valve casing adapted to be operated for controlling the flow of oil through the pump gear mechanism whereby the gears may be locked against rotation to cause the housing to rotate with the drive shaft and rotate the driven shaft and other means forming communication between the two compartments, including a cylindrical valve casing extending through the compartment and having a valve opening for each compartment and a slide valve rod therein, the first named slide valve rod extending exteriorly of the housing and tensioned in its direction of opening movement and manually operable means engaged with the projecting end of the rod for moving the same into the valve casing, the pump gear mechanism including a center gear fixed to the drive shaft, a pair of side gears meshing with center gear, an inclosure for the gears and an inlet and outlet for the housing with one of the side gears retarding the flow of oil to the outlet to increase pressure on the oil.

ALFRED G. WITTSTOCK.